UNITED STATES PATENT OFFICE.

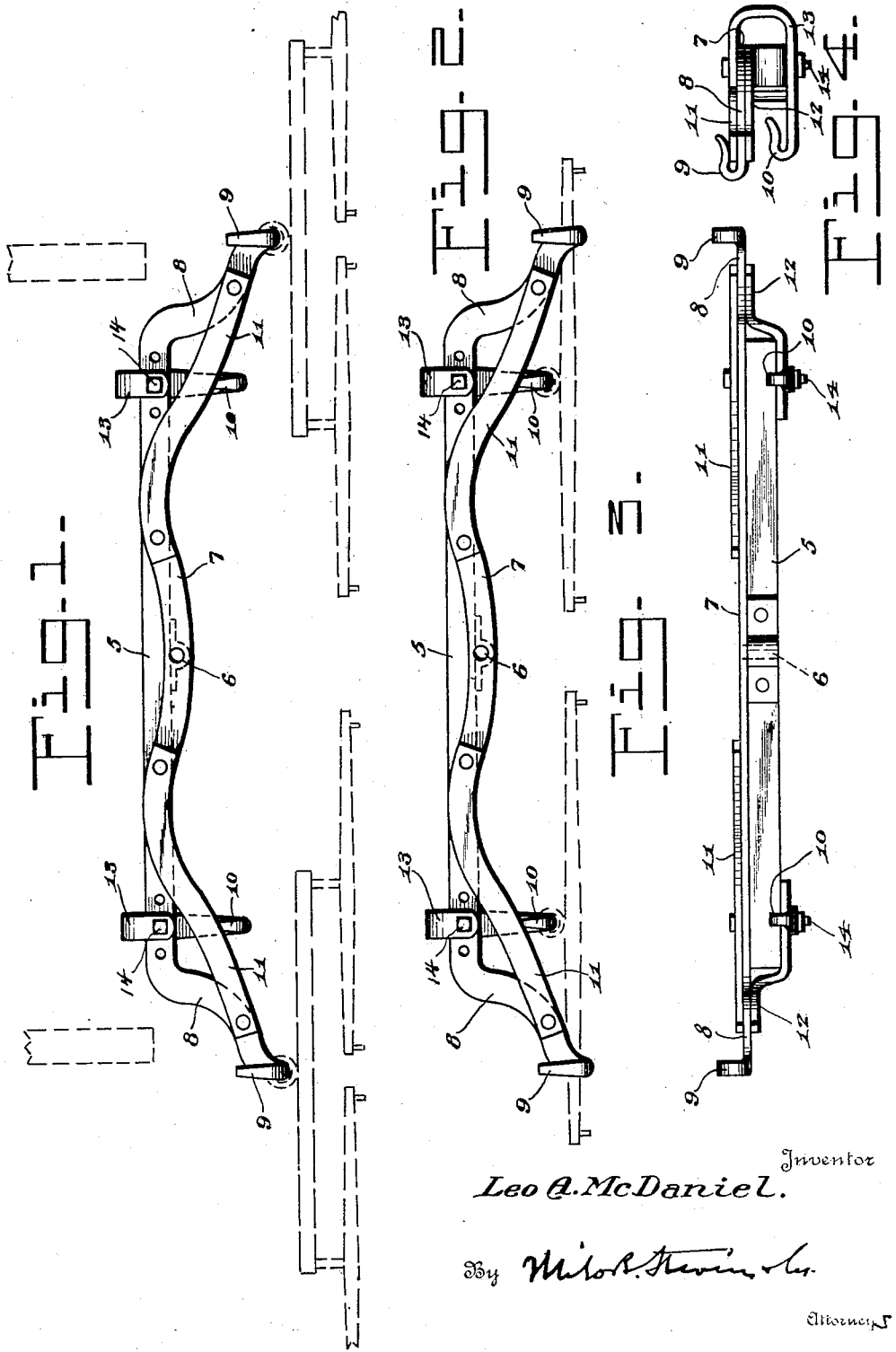

LEO A. McDANIEL, OF HERNDON, KANSAS.

WHIFFLETREE.

1,372,762.   Specification of Letters Patent.   Patented Mar. 29, 1921.

Application filed May 17, 1920. Serial No. 381,880.

*To all whom it may concern:*

Be it known that I, LEO A. McDANIEL, a citizen of the United States, residing at Herndon in the county of Rawlins and State of Kansas, have invented new and useful Improvements in Whiffletrees, of which the following is a specification.

This invention relates to whiffletrees, and its object is to provide a device of this kind which can be used as a doubletree and also as a four-horse evener.

The object stated is attained by means of a novel combination and arrangement of parts to be hereinafter described and claimed, and in order that the same may be better understood, reference is had to the accompanying drawing forming a part of this specification.

In the drawing,

Figures 1 and 2 are plan views of the device showing the two different ways it may be used;

Fig. 3 is a front elevation of the device, and

Fig. 4 is an end view thereof.

Referring specifically to the drawing, 5 denotes a wooden or other bar of suitable length having midway between its ends a bearing 6 for the bolt by which it is pivotally attached to the wagon tongue. On top of the bar 5 is fastened a metal bar 7 which projects from the ends of the former, and has its projecting ends offset forwardly as shown at 8, and terminating in hooks 9 for attachment of the doubletrees shown dotted in Fig. 1, each doubletree carrying two swingletrees, so that the device may now serve as a four-horse evener. Inwardly of the hooks 9, the bar 5 carries hooks 10 for the attachment of swingletrees as shown dotted in Fig. 2, if the device is to be used as a doubletree. It will be noted that the inside hooks 10 are located below and slightly to the rear of the outside hooks 9 so as not to interfere with the parts carried by the latter, and the outside hooks not interfering with the parts carried by the inside hooks.

The offset projecting portions 8 of the bars 7 are braced by top and bottom bars 11 and 12, respectively, riveted or otherwise fastened to said bars.

Each hook is at the extremity of one of the branches of a U-shaped strap 13 straddling the bars 7 and 12, a bolt 14 passing through both branches of the strap, and through the parts 7, 5 and 12 fastens the strap in place. The parts 7 and 12 have a number of bolt holes so that the hooks 10 may be adjusted laterally of the hooks 9.

The device is light, strong and durable, and it effectually serves the purpose for which it is designed.

I claim:

1. A whiffletree comprising a longitudinal bar having forwardly offset end portions provided with hooks at their extremities, and hooks on said bar positioned inwardly of the first-mentioned hooks.

2. A whiffletree comprising a longitudinal bar having forwardly offset end portions provided with hooks at their extremities, and hooks on said bar positioned inwardly of the first mentioned hooks, and adjustable laterally relatively thereto.

3. A whiffletree comprising a longitudinal bar having forwardly offset end portions provided with hooks at their extremities, and hooks on said bar positioned inwardly of and below the first-mentioned hooks.

4. A whiffletree comprising a longitudinal bar having forwardly offset end portions provided with hooks at their extremities, top and bottom brace bars between the longitudinal bar and the offset end portions thereof, U-shaped straps straddling the longitudinal bar and the bottom brace bar, one of the branches of said straps having hooks which are positioned inwardly of the first-mentioned hooks, and fasteners passing through the straps and the parts said straps straddle.

In testimony whereof I affix my signature.

LEO A. McDANIEL.